March 28, 1950 — R. OWENS — 2,501,911
FEEDER AND DELIVERER FOR HAY MANGLERS
Filed April 8, 1949 — 3 Sheets-Sheet 1
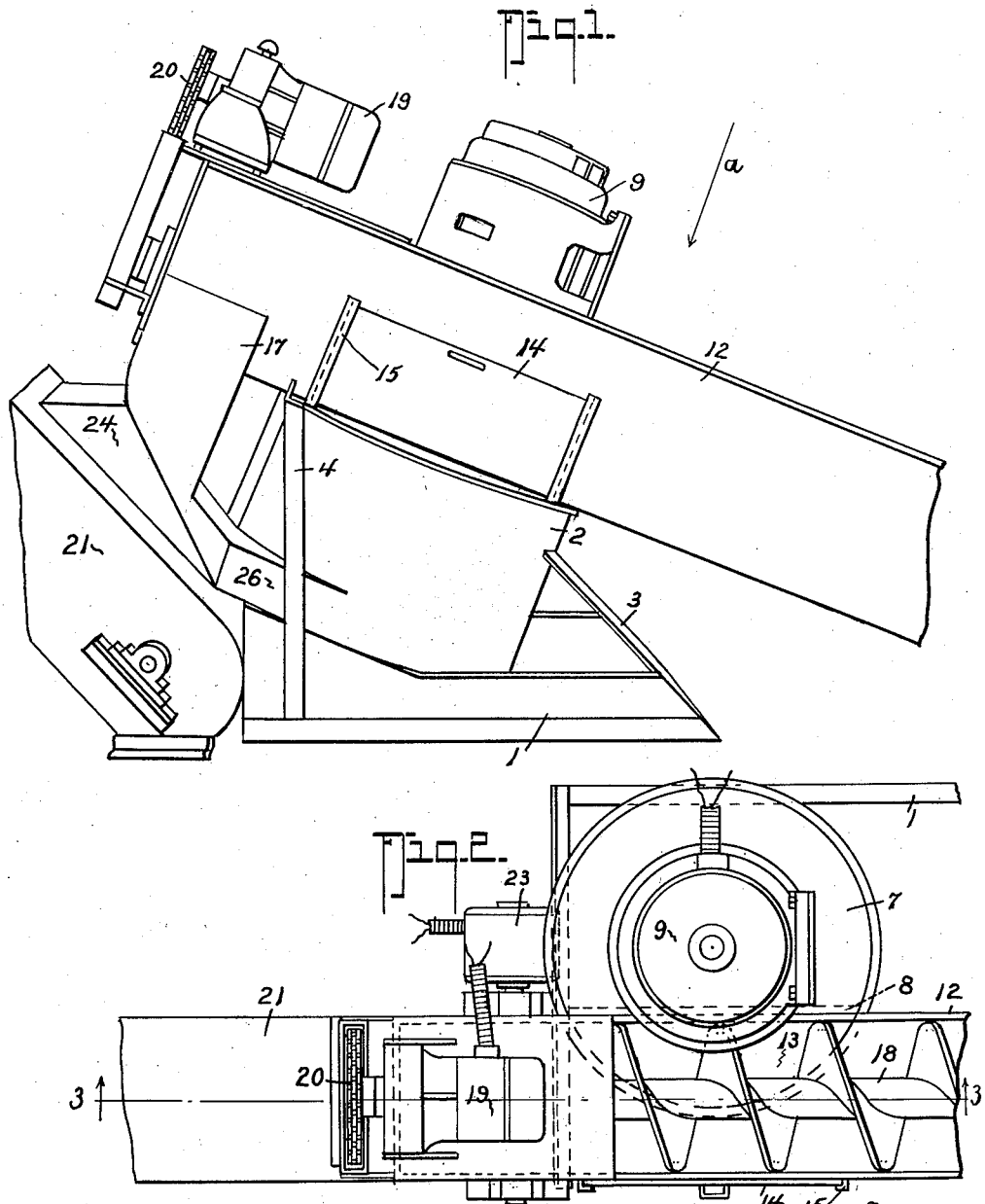
Inventor.
Roland Owens,
By Albert E. Dieterich,
ATTORNEY.

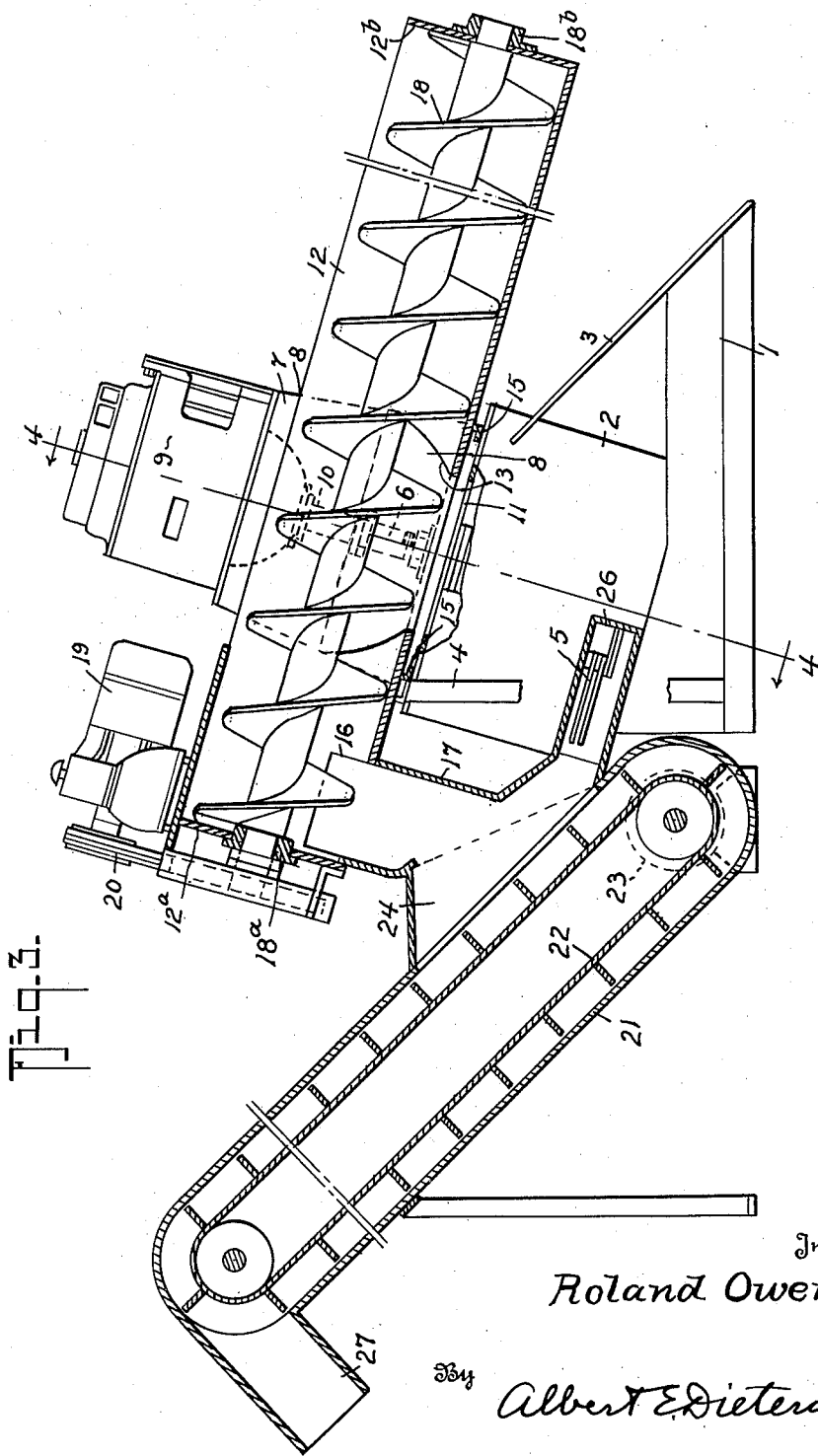

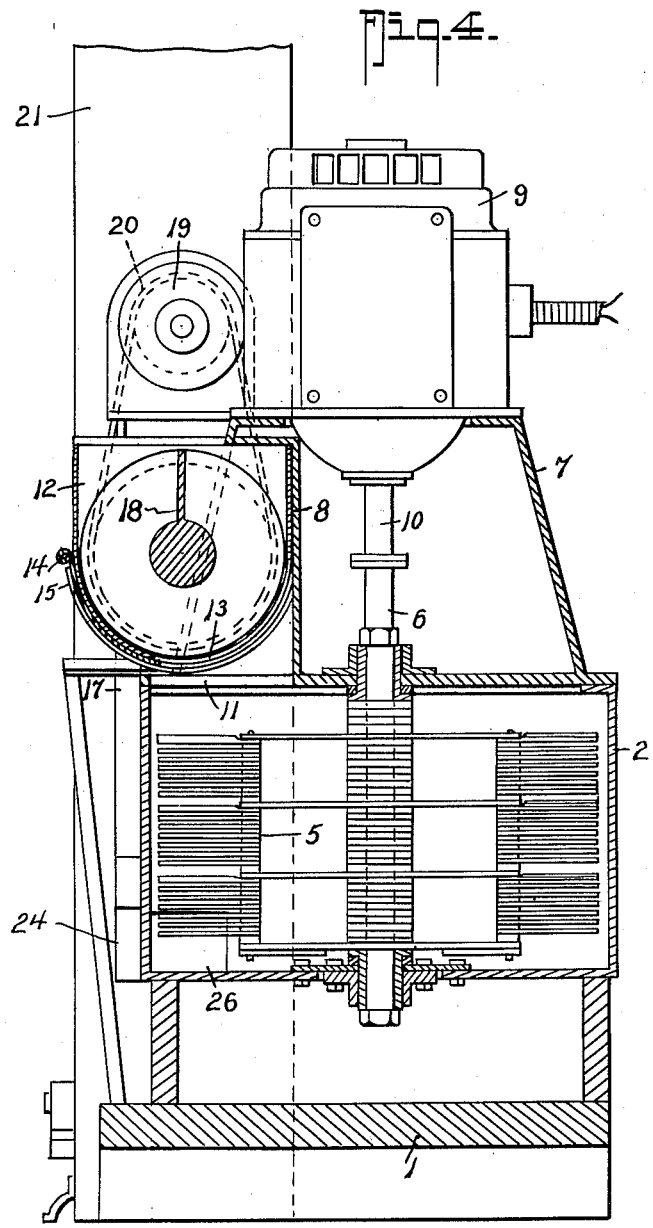

Patented Mar. 28, 1950

2,501,911

UNITED STATES PATENT OFFICE 2,501,911

FEEDER AND DELIVERER FOR HAY MANGLERS

Roland Owens, Verdon, Nebr.

Application April 8, 1949, Serial No. 86,296

2 Claims. (Cl. 241—186)

My invention relates to means for delivering hay or other materials to be shredded to a mangler particularly of the type disclosed in the application of myself and others filed October 8, 1946, Serial No. 701,882. A mangler of the type stated comprises, briefly, a casing in which a rotary beater or macerator turns on an upright axis tilted out of the vertical, on which casing is mounted a holder cone on top of which an electric motor is mounted. The shaft of the motor is coupled to the mangler shaft within the cone. At one side the cone is recessed to expose an opening in the top of the mangler casing through which opening the material to be comminuted is fed, there being a discharge opening in the casing adjacent its bottom through which the comminuted material is ejected through centrifugal force.

The objects of the present invention are:

1. To provide an uptake conveyor for carrying the hay to the top or intake opening of the mangler casing, the conveyor lying in part in the recess of the motor-supporting cone and being driven by a separate motor.

2. To provide a suitable gate or cut-off, whereby the hay may by-pass the mangler when desired and be delivered directly to an elevator or uptake conveyor which is a part of the dryer.

3. To provide a by-pass which, when not in use as such, will serve as an air equalizer to cut down pressure on the uptake conveyor of the dryer.

Other objects will in part be obvious and in part be pointed out hereinafter.

To the attainment of the aforesaid objects and ends invention still further resides in the novel details of construction, combination and arrangement of parts, all of which will be first fully described in the following detailed description, and then be particularly pointed out in the appended claims, reference being had to the accompanying drawing, in which:

Fig. 1 is a side elevational-perspective view illustrating my invention.

Fig. 2 is a top plan view of the same looking in the direction of the arrow a in Fig. 1.

Fig. 3 is a section on the line 3—3 of Fig. 2, parts being shown in elevation.

Fig. 4 is an enlarged detail cross section taken on the line 4—4 of Fig. 3.

In the accompanying drawings in which like numerals of reference indicate like parts in all the figures, 1 represents a base or support for the hay mangler which includes the casing 2, in which casing the macerator-blade rotor 5 is mounted. The casing is also supported by suitable brace 3. The mangler has its shaft 6 coupled to the shaft 10 of a motor 9. The motor is mounted on the small end of a motor-supporting cone 7 which is in turn mounted on the top of the casing 2.

The cone 7 has a recess 8 in its wall to expose the inlet opening 11 in the top of the casing and the casing 2 has a discharge outlet 26 tangentially disposed with respect to the circumference of the casing.

12 designates a U-shaped-in-cross-section trough into the lower end of which the hay or other material to be comminuted is deposited and conveyed upwardly by an auger 18 mounted in suitable bearings 18$^a$, 18$^b$ in the ends 12$^a$, 12$^b$ of the trough.

The trough 12 has a discharge opening 13 over the casing inlet opening 11 and fits in the recess 8 as best shown in Fig. 4. A door or slide gate 14 mounted in guides 15 enables the trough opening 13 to be closed when desired. Beyond the opening 13, at the upper end of the trough, is a by-pass outlet or opening 16 in the trough from which a by-pass duct 17 conveys material to the inlet 24 of an elevator casing 21 into which duct 17 the mangler outlet 26 discharges.

The auger 18 is driven by an electric motor 19 mounted on top of the trough and connected with the auger by a sprocket and chain drive 20.

Within the casing 21 is an endless belt or chain slat conveyor 22 which takes the material from the inlet 24 and discharges it at a high elevation via a spout 27, the conveyor being driven in any suitable way, as for example, by an electric motor 23.

Under normal operating conditions the speed of the auger is adjusted to deliver only the amount of hay to the mangler that the mangler can take care of. Should, however, the mangler jam up with undischarged material before the motor 19 could be stopped and gate 13 closed the hay would be discharged into by-pass 17, giving time for the attendant to stop the motor 19.

Should it be desired to load on to a wagon or other receptacle uncomminuted or dry hay, it is only necessary to close the gate 14, whereupon with motors 23 and 19 operating hay or other material may be transferred from the lower end of the trough 12 to discharge spout 27 via by-pass 17 without running the motor 9.

When running normally to comminute the hay, the comminuted material is discharged via outlet 26 directly onto the conveyor 22 under centrifugal force.

From the foregoing description, taken in connection with the accompanying drawings, it is thought that the construction, operation and advantages of the invention will readily appear to those skilled in the art.

What I claim is:

1. In a machine of the class described wherein is provided a mangler which includes a casing having a top inlet and a bottom outlet, a rotary beater within the casing, a drive motor and a cone on the top of said casing, on which cone the motor is mounted, operative connections between said motor and said beater; the improvement which includes a trough recessed into the side of said cone and having an outlet registering with said top inlet, said trough extending beyond the mangler, an auger in said trough, means for driving said auger to convey material along said trough, an elevator suitably located to receive material from said bottom outlet and a by-pass duct connecting the extended portion of said trough with said elevator, and means to run said elevator.

2. In a machine of the class described wherein is provided a mangler which includes a casing having a top inlet and a bottom outlet, a rotary beater within the casing, a drive motor and a cone on the top of said casing on which cone the motor is mounted, operative connections between said motor and said beater; the improvement which includes a trough recessed into the side of said cone and having an outlet registering with said top inlet, said trough extending beyond the mangler, an auger in said trough, means for driving said auger to convey material along said trough, an elevator mounted to receive material from said bottom outlet and a by-pass duct connecting the extended portion of said trough with said elevator, means to run said elevator, and a gate on said trough for closing the trough outlet that registers with said top inlet.

ROLAND OWENS.

REFERENCES CITED

The following references are of record in the file of this patent:

UNITED STATES PATENTS

| Number | Name | Date |
|---|---|---|
| 246,992 | Anderson | Sept. 13, 1881 |
| 1,478,867 | Bausman | Dec. 25, 1923 |
| 1,579,001 | Key | Mar. 30, 1926 |
| 1,632,341 | Koch | June 14, 1927 |
| 1,669,239 | Grindle | May 8, 1928 |
| 2,359,911 | Grindle | Oct. 10, 1944 |

FOREIGN PATENTS

| Number | Country | Date |
|---|---|---|
| 6,424 | Austria | Jan. 10, 1902 |